(12) United States Patent
Rodriguez et al.

(10) Patent No.: US 6,763,122 B1
(45) Date of Patent: Jul. 13, 2004

(54) WATERMARKING AN IMAGE IN COLOR PLANE SEPARATIONS AND DETECTING SUCH WATERMARKS

(76) Inventors: Tony Rodriguez, 3104 NE. 31st Ave., Portland, OR (US) 97212; Ammon Gustafson, 13305 SW. Lancewood St., Beaverton, OR (US) 97008; Marc Miller, P.O. Box 596, Corte Madera, CA (US) 94976; Alastair M. Reed, 1115 C Ave., Lake Oswego, OR (US) 97034; Geoffrey B. Rhoads, 2961 SW. Turner Rd., West Linn, OR (US) 97068

( * ) Notice: Subject to any disclaimer, the term of this patent is extended or adjusted under 35 U.S.C. 154(b) by 526 days.

(21) Appl. No.: 09/694,465

(22) Filed: Oct. 23, 2000

Related U.S. Application Data

(60) Provisional application No. 60/163,676, filed on Nov. 5, 1999.

(51) Int. Cl.⁷ .................................................. G06K 9/00
(52) U.S. Cl. ....................... 382/100; 382/162; 382/163; 382/166; 715/517; 358/3.28
(58) Field of Search ................................. 382/100, 162, 382/167, 175, 163; 713/176; 358/1.9, 518, 500, 3.28; 715/517; 283/70, 73; 380/51, 243; 101/54, 453

(56) References Cited

U.S. PATENT DOCUMENTS

| | | | |
|---|---|---|---|
| 5,051,835 A | | 9/1991 | Bruehl ........................ 358/311 |
| 5,062,360 A | * | 11/1991 | Germann et al. ............ 101/152 |
| 5,349,648 A | * | 9/1994 | Handley ...................... 715/517 |
| 5,467,581 A | * | 11/1995 | Everette ..................... 53/133.2 |
| 5,521,722 A | * | 5/1996 | Colvill et al. ................ 358/500 |
| 5,530,751 A | | 6/1996 | Morris |
| 5,530,759 A | | 6/1996 | Braudaway |
| 5,617,119 A | | 4/1997 | Briggs |
| 5,636,292 A | | 6/1997 | Rhoads |

(List continued on next page.)

FOREIGN PATENT DOCUMENTS

| | | |
|---|---|---|
| EP | 1137244 | 9/2001 |
| GB | 2360659 | 9/2001 |
| WO | WO99/53428 | 10/1999 |
| WO | WO 01/08405 A1 | 2/2001 |
| WO | WO01/08405 | 2/2001 |
| WO | WO02/19269 | 3/2002 |

OTHER PUBLICATIONS

U.S. patent application Ser. No. 60/163,676, Rhoads, et al., filed Nov. 5, 1999.

(List continued on next page.)

*Primary Examiner*—Jayanti K. Patel
*Assistant Examiner*—Barry Choobin
(74) *Attorney, Agent, or Firm*—Digimarc Corporation

(57) ABSTRACT

Colored images are divided into color planes and watermarks are inserted into the individual color planes. One or more watermarks can be inserted into one or more of the color planes. In order to print a color image the image is divided into color planes corresponding to the colors of ink used for printing. A separate plate is used to print each color. The different plates must be precisely aligned. Any misalignment will cause blurring in the image and may make it difficult or impossible to read a watermark in the image. Misalignment of the plates can cause the watermark data in one color plane to, in effect, cancel out the watermark data in a different color plane. With the present invention a watermark is inserted into a selected color plane only, thus there is no cancellation due to misalignment of color plates. The watermark detection and reading can be done after the image is divided into color planes.

10 Claims, 13 Drawing Sheets

U.S. PATENT DOCUMENTS

| | | | |
|---|---|---|---|
| 5,652,626 A | | 7/1997 | Kawakami |
| 5,659,726 A | | 8/1997 | Sandford, II et al. |
| 5,689,623 A | | 11/1997 | Pinard |
| 5,735,547 A | * | 4/1998 | Morelle et al. ............... 283/67 |
| 5,819,289 A | | 10/1998 | Sanford, II et al. |
| 5,825,892 A | | 10/1998 | Braudaway et al. |
| 5,862,260 A | | 1/1999 | Rhoads |
| 5,875,249 A | | 2/1999 | Mintzer et al. |
| 5,893,101 A | | 4/1999 | Balogh |
| 5,905,800 A | | 5/1999 | Moskowitz et al. |
| 5,930,369 A | | 7/1999 | Cox |
| 5,946,414 A | | 8/1999 | Cass |
| 6,064,464 A | * | 5/2000 | Yamada ....................... 355/40 |
| 6,122,403 A | | 9/2000 | Rhoads |
| 6,185,312 B1 | | 2/2001 | Nakamura et al. |
| 6,239,818 B1 | * | 5/2001 | Yoda ........................... 347/43 |
| 6,246,777 B1 | | 6/2001 | Agarwal et al. |
| 6,332,031 B1 | | 12/2001 | Rhoads et al. |
| 6,334,187 B1 | | 12/2001 | Kadono ...................... 173/176 |
| 6,345,104 B1 | | 2/2002 | Rhoads |
| 6,356,363 B1 | * | 3/2002 | Cooper et al. ............... 358/1.9 |
| 6,385,329 B1 | | 5/2002 | Sharma et al. |
| 6,404,926 B1 | | 6/2002 | Miyahara et al. |
| 6,449,377 B1 | | 9/2002 | Rhoads |
| 6,535,617 B1 | * | 3/2003 | Hannigan et al. ........... 382/100 |
| 6,556,688 B1 | * | 4/2003 | Ratnakar .................... 382/100 |
| 6,559,975 B1 | * | 5/2003 | Tolmer et al. ............... 358/1.9 |
| 6,577,744 B1 | * | 6/2003 | Braudaway et al. ......... 382/100 |
| 6,590,996 B1 | * | 7/2003 | Reed et al. .................. 382/100 |
| 6,614,914 B1 | | 9/2003 | Rhoads |
| 6,625,295 B1 | | 9/2003 | Wolfgang et al. |
| 6,636,615 B1 | | 10/2003 | Rhoads et al. |
| 2001/0030759 A1 | | 10/2001 | Hayashi et al. |
| 2001/0030761 A1 | | 10/2001 | Ideyama |
| 2001/0033674 A1 | | 10/2001 | Chen et al. |
| 2001/0037455 A1 | | 11/2001 | Lawandy et al. |
| 2001/0040980 A1 | | 11/2001 | Yamaguchi |
| 2001/0052076 A1 | | 12/2001 | Kadono |
| 2002/0009208 A1 | | 1/2002 | Alattar et al. |
| 2002/0018879 A1 | | 2/2002 | Barnhart et al. |
| 2002/0021824 A1 | | 2/2002 | Reed et al. |
| 2002/0023218 A1 | | 2/2002 | Lawandy et al. |
| 2002/0027612 A1 | | 3/2002 | Brill et al. |
| 2002/0031241 A1 | | 3/2002 | Kawaguchi et al. |
| 2002/0054356 A1 | | 5/2002 | Kurita et al. |
| 2002/0054680 A1 | | 5/2002 | Huang et al. |
| 2002/0076086 A1 | | 6/2002 | Yoshiura |
| 2002/0090112 A1 | | 7/2002 | Reed et al. |
| 2002/0120849 A1 | | 8/2002 | McKinley et al. |
| 2002/0126872 A1 | | 9/2002 | Brunk et al. |
| 2002/0163671 A1 | | 11/2002 | Takaragi et al. |
| 2002/0164048 A1 | * | 11/2002 | Bruckstein et al. ......... 382/100 |
| 2002/0164051 A1 | | 11/2002 | Reed et al. |
| 2002/0164052 A1 | | 11/2002 | Reed et al. |
| 2002/0168085 A1 | | 11/2002 | Reed et al. |
| 2003/0058477 A1 | * | 3/2003 | Brunk et al. ............... 358/3.28 |
| 2003/0103645 A1 | | 6/2003 | Levy et al. |
| 2003/0187798 A1 | | 10/2003 | McKinley et al. |

OTHER PUBLICATIONS

OTHER PUBLICATIONS

Article: Non–noticeable Information Embedding in Color Images: marking and Detection Josep vidal, Elisa Sayrol, Silvia Cabanillas, Sonin Santamaria 1999 IEEE 0–7803–5247–5/99.

"Video Demystified—A handbook for the Digital Engineer" Second Edition, By Keith Jack, HighTect Publications, pp. 39 to 63.

Battiato et. al. "Robust Watermarking for Images Based on Color Manipulation", Third Int. Image Hiding Workshop 1999.

Fleet et. al. "Embedding Invisible Information in Color Images", IEEE Int. Conf on Image Proc. Oct. 1997, Vol 1, pp 532, 535.

* cited by examiner

FIG. 7

WATERMARKING AN IMAGE IN COLOR PLANE SEPARATIONS AND DETECTING SUCH WATERMARKS

RELATED APPLICATION

This application is a continuation-in-part of application Ser. No. 60/163,676 filed Nov. 5, 1999.

FIELD OF THE INVENTION

The present invention relates to steganography and more particularly to inserting digital watermarks in images and to detecting and reading such watermarks.

BACKGROUND AND SUMMARY OF THE INVENTION

The technology for inserting digital watermarks into images is well developed. For example see issued U.S. Pat. No. 5,862,260 (Rhoads), U.S. Pat. No. 5,930,369 (Cox), U.S. Pat. No. 5,905,800 (Moskowitz), and U.S. Pat. No. 6,122,403 (Rhoads) and co-pending application Ser. No. 09/553,084 filed Apr. 19, 2000 (now U.S. Pat. No. 6,590,996), all of which are hereby incorporated herein by reference. Watermarking technology is also included in some commercially available image editing programs such as "Adobe Photoshop" which is marketed by Adobe Corporation of San Jose Calif. and "Corel Draw" which is marked by Corel Corporation of Ontario Canada.

Colored Images are generally stored in computers using a RGB (Red, Green, Blue) format. The above referenced commercially available programs insert a watermark into an RGB image by modifying the luminance value of pixels in the image. The value of each color plane in the image is modified by the known relationship between overall luminance and the value of each color plane. For example, it is known that the ratio between overall luminance and the value of the colors in an RGB image is 0.3 for Red, 0.6 for Green and 0.1 for Blue.

In many situations better results can be achieved if the watermark is inserted adaptively. That is, if the intensity of the watermark inserted in each particular area of the image is adjusted in accordance with the data hiding attributes associated with that particular area of the imager. The above referenced commercial image editing programs insert watermarks into images adaptively. U.S. Pat. No. 6,590,996 filed Apr. 19, 2000 (which is incorporated herein by reference) describes adapting the watermarking process to the color of an image.

Colored images are printed using multiple printing plates. The image is divided into color planes corresponding to the colors of ink used to print the image. Each color is printed using a separate plate which prints that color. For example an image may be separated into Cyan, Magenta, Yellow and Black (CMYK) color planes. A separate plate is used to print each color. The different plates must be precisely aligned. Any misalignment of the plates will cause blurring in the image and may make it difficult or impossible to read a watermark that was embedded in the image.

That is, when an image contains digital watermark data in each color plane, misalignment of the plates used to print different colors can cause the watermark data in one color plane to, in effect, cancel the watermark data in a different color plane.

FIG. 1 illustrates the main steps in an image watermarking process. The process begins with an image 101 which has RGB (red, green blue) values for each pixel in the image. The object of the process is to insert watermark payload data 102 into image 101. The change (or tweak) for the luminance of each pixel in image 101 which will insert the payload 102 into the image is calculated. An example of how tweak values can be calculated is shown in the above referenced issued U.S. patents and in other publicly available literature. The tweak values for the luminance are changed into changes in RGB values as indicated by block 105. The transformation is done according to the known relationship between color values and luminance. Generally the luminance of a pixel can be approximated as 0.3 times the red value plus 0.6 times the green value plus 0.1 times the blue value.

The color values of each pixel in the image 101 are changed by the calculated amounts as shown in FIG. 1B in order to watermark the image. Watermark data tile 116 specifies the amount of change in luminosity for each pixel in a square array of pixels. The pixels in the image 101 are divided into an array of squares that have the same size as the tile 116. The amount that the pixels in image 101 are changed is adapted to the characteristics of the image. For example consider two squares 118a and 118b in the image 101. If the characteristics in square 118a are such that it can carry less watermark signal than the characteristics of the image in square 118b, the pixels in square 118a may only be changed by one half of the amount specified in tile 116 and the pixels in square 118b may be changed by the full amount specified in the tile 116. The technology for adaptively inserting watermark signals in an image using various techniques is known.

Finally, as indicated by block 107, the RGB colors are changed into CMYK (cyan, magenta, yellow, and black) values for printing, and each color is printed with a separate plate as indicated by block 108. If the plates used to print the different colors are misaligned, the watermark in one color can effectively cancel the watermark in another color.

Printing with misaligned plates is illustrated in FIG. 2, which shows (greatly exaggerated and simplified) the areas printed by different plates for two pixels in the image. To facilitate illustration and explanation, in FIG. 2, rectangles are used to designate the area printed by a first color plate and the circles are used to designate areas printed by a different color plate. The areas are the size of one pixel in the image. It is noted that in a typical printing process the areas would have the same shape. They are shown here as having different shapes for ease of illustration and explanation. It is also noted that each pixel area would normally contain multiple ink dots. The actual ink dots are not shown in FIG. 2. As illustrated in FIG. 2, square 201C represents the cyan printing from one pixel in the image and circle 201Y represents the yellow printing from this same pixel. The same applies to square 202C and circle 202Y. If the plates where aligned, the circles and squares would be directly on top of each other. However, in the illustration shown in FIG. 2, due to misalignment of the printing plates, the circles and squares are not aligned. Let us assume that the watermarking process increased the luminance of the pixel from which square 201C and circle 201Y originated and decreased the luminance of the adjacent pixel. Since the plates were misaligned, in the area where circle 201Y overlaps square 202C, the plus increment in circle 201Y would cancel the negative decrement in square 202C. Thus, misalignment of printing plates can have the effect of at least partially canceling watermark data in an image. In most situations the misalignment would not completely cancel the watermark data; however, it would weakens the watermark signal.

One aspect of the present invention is directed to minimizing the effect of plate misalignment on the detectability and readability of watermark data in an image. The effect of misalignment of the printing plates is minimized by detecting the dominant color in an image and inserting a watermark only into that color plane of the image. In another embodiment of the invention, the image is divided into regions and the dominant color in each region is determined. In each region the watermark data is inserted into the dominant color in that region. In still another embodiment of the invention, a first watermark is inserted into the dominant color plane of an image and a second watermark is inserted in one of the other color planes of the image. In still another embodiment of the invention the dominant color of the entire image (or of a region of the image) is detected and the watermark is inserted into the dominant color if that color is on the yellow-blue axis. If the dominant color is not on the yellow-blue axis, the watermark is inserted into the strongest of the secondary colors.

In a situation where an image is watermarked by first separating the image into color planes and inserting a watermark into one or more color plane, it is easier to detect and read the watermark if the image is first separated into the same color planes as the color planes used during the embedding and printing operation. If one knows the color planes into which the image was divided during the insertion process, during the detection and reading process one would divide the image into these same colors before performing the detection and reading operation.

However, if one does not know the color planes into which the image was divided before the watermark was inserted (that is, if one does not know the color of the inks used to print the image), one can approximately determine the colors of the inks used to print the image by: First translating the image into a representation such as for example a HSI (hue saturation intensity) and next making a histogram of the hue values of the pixels in the image. The dominant hues represent an approximation of the colors used to print the image. The image can then be divided into these colors and the watermarks read from these colors. The histogram can also be made using other similar representations such as HSV, YUV, YcrCb, etc.

Multiple watermarks can be embedded into a single image by first dividing the image into multiple color planes, and by embedding a different watermark in each color plane. If the orientation of the watermark introduced into each color plane differs from the orientation of the watermarks in the other color planes, any noise created by miss-registration of the printing plates is non-correlated and thus the watermark in one color would not interfere with reading the watermark from a different color. Thus, when introducing watermarks in more than one color plane, the watermarks in the different color planes can be introduced in different orientations to minimize noise.

It is also noted that when an image is rasterized for printing, the rasterization for each color plane is typically done in a different direction. For example if the CMYK colors are used, the orientations might be Cyan 0 degrees, Magenta 45 degrees, Yellow 15 degrees, and black 75 degrees. The orientations are set by the printer. Better detection can be achieved if the watermark is introduced in each color plane at the same angle as the angle used to print that color plane. In this way, the rasterization proceeds parallel to the watermark orientation.

BRIEF DESCRIPTION OF THE FIGURES

FIG. 7 illustrates an image divided into regions or areas.

DETAILED DESCRIPTION

The specific embodiments of the invention described below relate to inserting watermarks into single images (i.e. still images). It should however be appreciated that the invention is equally applicable to watermarking video images.

In the first embodiment described an image is divided into the color planes used to print the image and a watermark is then inserted into one or more or more of the color planes. The watermarks inserted into different color planes can be the same watermark or they can be different watermarks. In a subsequently described embodiment, the dominant color plane of the image (or of part of the image) is determined and a watermark is inserted into the dominant color. In still another embodiment the watermark is inserted into the dominant color plane or into another color plane dependent upon certain conditions that are described. Finally several embodiments directed to reading the watermark and detecting the color plane from which the watermark is to be read are described.

Figure 1A:
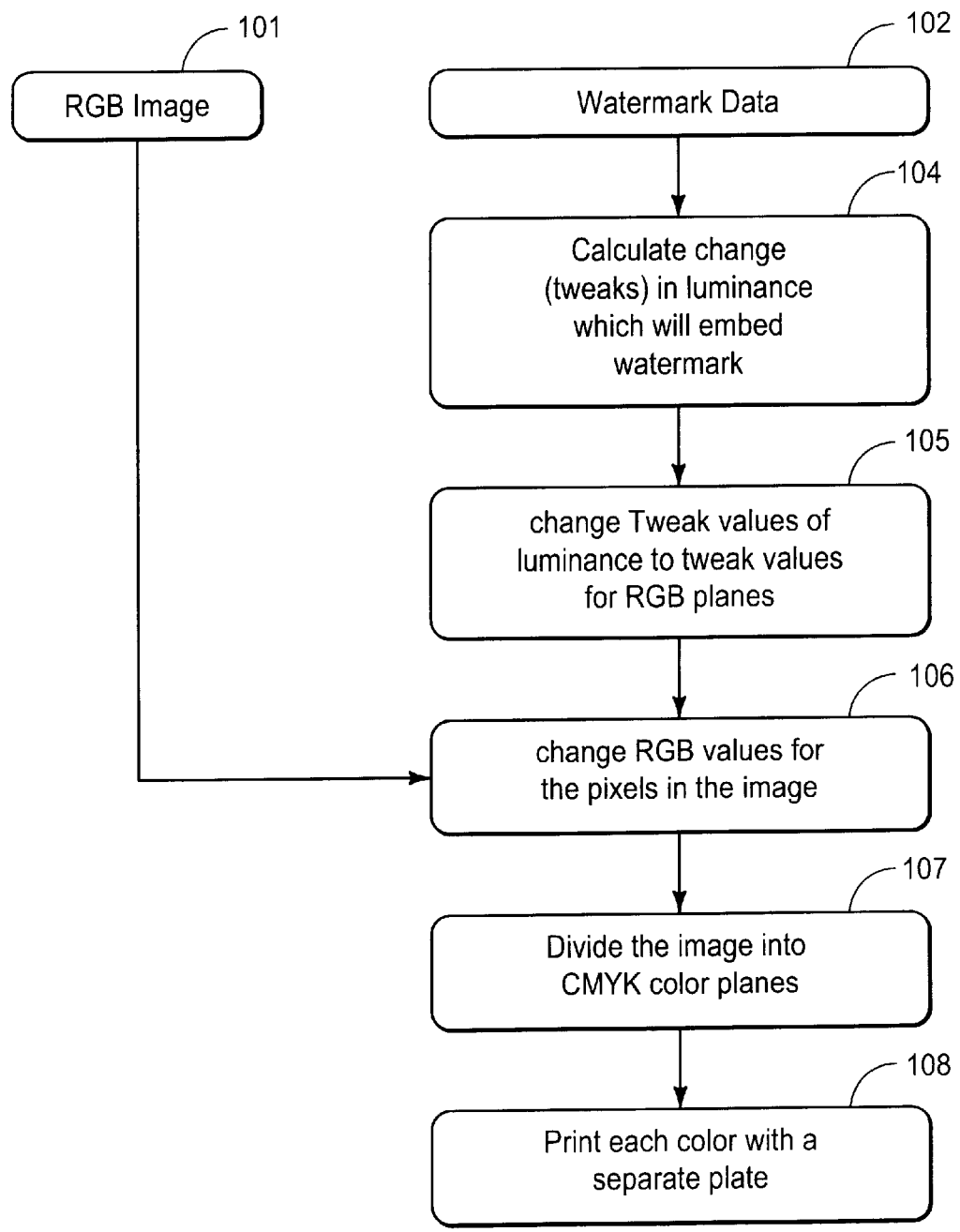
FIGS. 1A and 1B illustrate the process of inserting a watermark into an image.
Figure 1B:
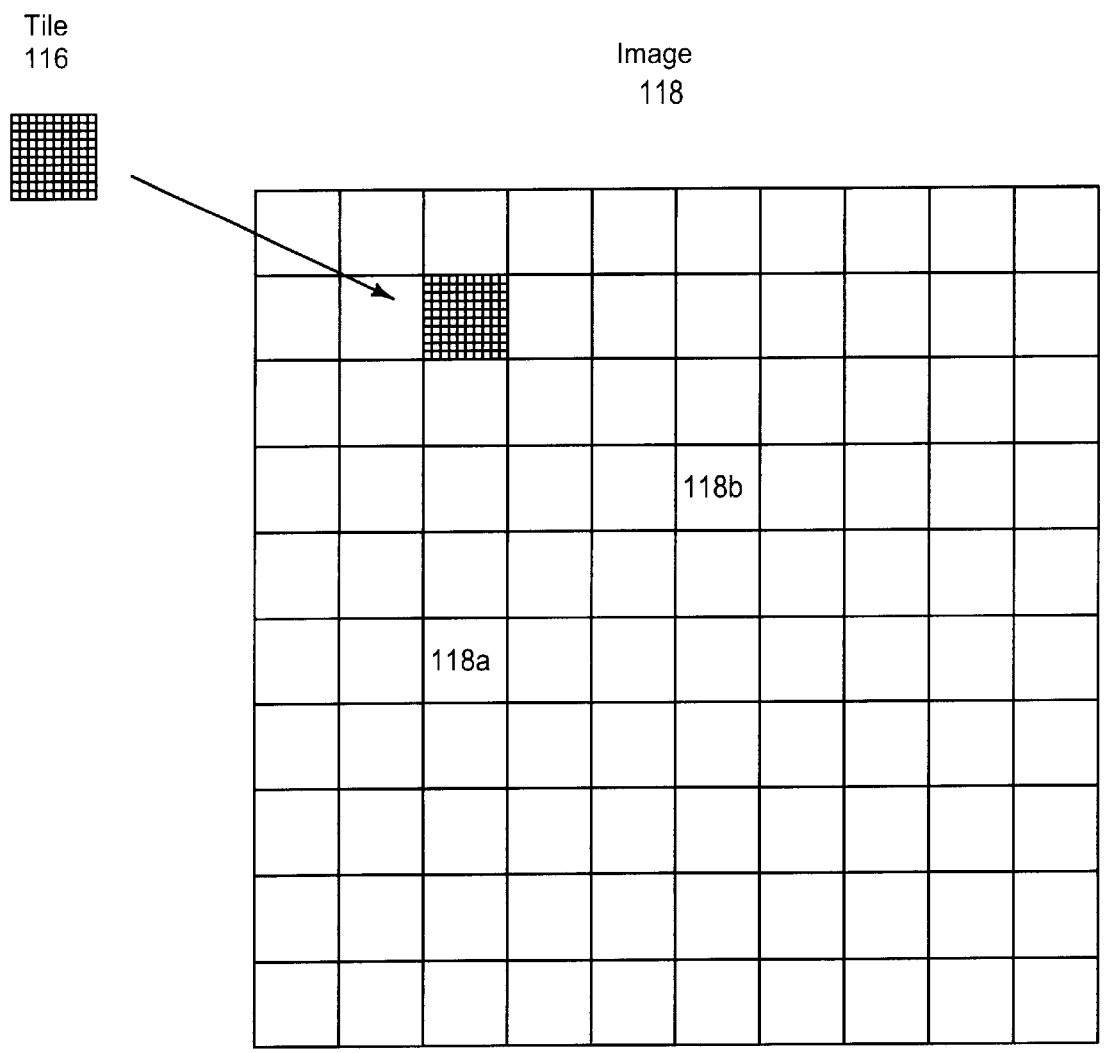
Figure 2:
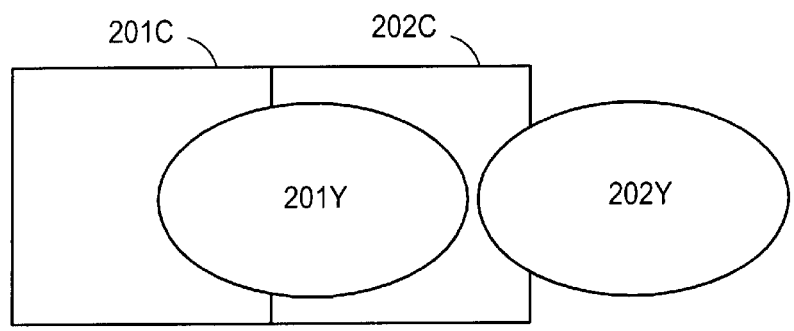
FIG. 2 illustrates the effect of misaligned printing plates.
Figure 3:
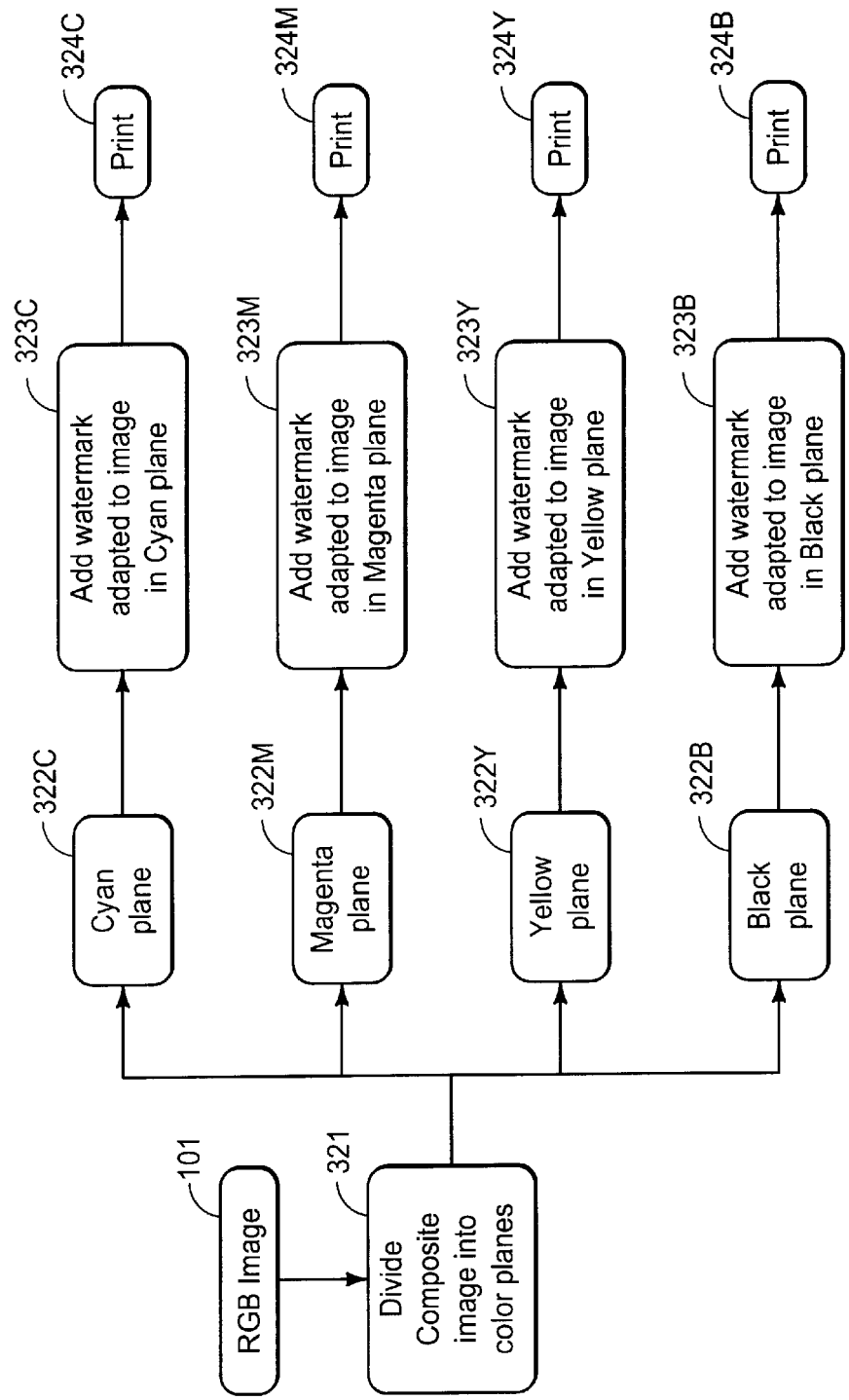
FIG. 3 is an overall flow diagram of a process of inserting different watermarks in different color planes of an image.

The overall steps in the process of inserting different watermarks into different color planes of an image is shown in FIG. 3. The process can begin with a conventional image 101 which is stored in a conventional RGB format. As is known, in order to print an RGB image it is generally separated into the four, CMYK, color planes as indicated by block 321. The color planes are designated 322C, 322M, 322Y and 322B in FIG. 3. The process of separating an image into CMYK color planes is explained in detail in books including "Color PC" and "The Color Mac," both by Marc Miller. Such a process is implemented in many commercially available programs such as "Adobe Photoshop" which is marketed by Adobe Corporation of San Jose Calif. and "Corel Draw" which is marketed by Corel Corporation of Ontario Canada. The color planes into which an image is separated need not be CMYK. In some situations the color separations for an image are individually designed.

In accordance with an embodiment of the present invention, each separated image is operated on separately as indicated by blocks 323C, 323M, 323Y and 323B. A watermark is adaptively added to each color separation as described later with reference to FIG. 4. Finally each color plane is printed as indicated by blocks 324C, 324M, 324Y and 324B.

Figure 4:
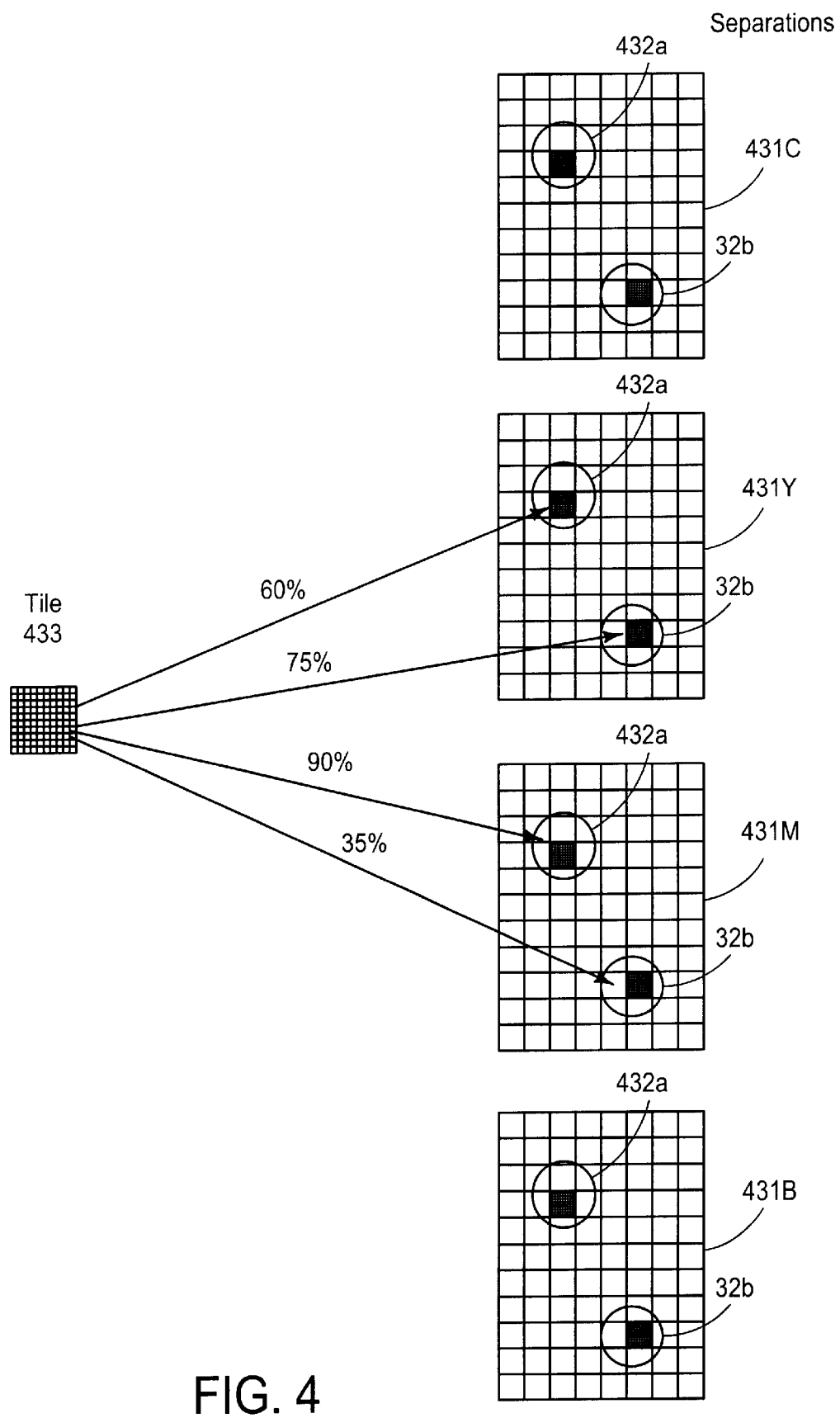
FIG. 4 is a more detailed diagram illustrating how a watermark can be adaptively added to different color planes of an image.

FIG. 4 illustrates in more detail how the process of inserting a watermark in an image operates relative to two areas of an image 101 that are designated 432a and 432b. In FIG. 4 the four CMYK color separations of image 101 are shown as separations 431C, 431M, 431Y and 431B. The watermark data tile 433 specifies the amount of change for each pixel in an area in order to add a particular digital watermark to an image. The image is divided into squares the size of this tile and the pixels in each square are changed by some percentage of the amount specified in tile 433. The amount of the change in each square area in each of the color planes in image is established by determining the amount of change that can be made without creating visual artifacts.

As an example, FIG. 4 shows two areas designated 432a and 432b. For purposes of illustrating the operation of the present invention, assume that areas 432a and 432b have the same overall luminance characteristics but that the luminance characteristics of each of the color planes differs in area 432a and 432b. If the prior art technology was used, the intensity of the watermark in both areas would be equal since the overall luminance of the two areas is identical. However the present invention takes into account the luminance characteristics of the individual color planes. This could for example result in:

Area 432a: 60 percent in the yellow plane and 90 percent in the magenta plane

Area 432b 75 percent in the yellow plane and 35 percent in the magenta plane.

For simplicity in illustration the percentages in only two of the color planes is shown in FIG. 4. Naturally in any practical image, all four colors would be involved and the watermark added to each area would be adapted to the characteristics of that area in each color separation.

A variety of techniques are described in the prior art for adaptively encoding a watermark in an image. In some adaptive techniques the response characteristics of the human visual system (HVS) are taken into consideration and the frequency domain or pixel domain attributes of the encoding is tailored accordingly. Others techniques employ what can be considered to be simpler approaches, e.g., increasing the encoding energy in spatial regions (or frequency spectra) that already have high energy, or in regions of rapid local change in pixel energy. The principles of the present invention can be employed utilizing the adaptive techniques of various know adaptive technologies. That is, with the present invention a separate watermark can be inserted in each color separation using anyone of a variety of adaptive technologies.

The image 101 could be any type of image. For example the image may contain lines the width of which are varied to carry a watermark, or the image may comprise a weave or tint pattern that carries a watermark, in accordance with the teachings of U.S. application Ser. No. 09/074,034, filed May 6, 1998 (now U.S. Pat. No. 6,449,377) (corresponding to PCT/US99/08252, now published as WO99/53428), and Ser. No. 09/127,502 filed Jul. 31, 1998 (corresponding to PCT/US99/14532). The disclosures of the above referenced documents are hereby incorporated herein in their entireties by reference.

In the above embodiment of the invention the same watermark data payload is encoded into each of the color planes. That is tile 433 in FIG. 4 is used to encode a watermark in each color plane. In an alternative embodiment, different watermark data is adaptively encoded into each different color separation. That is, with reference to FIG. 4, instead of the one color tile 433, there could be a number of color tiles 433a, 433b, etc., up to one for each color separation. Different tiles would then be used to encode data in different color planes.

The above description had been directed to the encoding process. Similarly, an image can first be separated into color planes and then a detection process can be applied. The watermarking detection and reading process in programs such as the previously referenced image editing programs is applied to the image before the image is separated into color planes. In situations where the watermark has been inserted into an image after the image has been divided into color planes, in order to easily detect a watermark, the image can first be divided into color planes and the detection mechanism can be applied to the data in the individual color separations. Thus, in a four color plane separation, there would be four detection and reading results which could be combined in various manners to achieve increased reliability in the detection process.

In the embodiments described with reference to FIGS. 3 and 4, an image is divided into the colors used to print the image and the same or separate (i.e. different) watermarks are inserted into these color planes. In an alternative embodiment, the image is divided along a different axis and the same or different watermarks are inserted into the images which result from the division. Preferably (but not necessarily) the axes are orthogonal. For example an image that will be printed with CMYK plates can be divided into RGB colors and a watermark inserted into each of these color planes. Alternatively one watermark may be inserted by changing the luminosity values and a different watermark can be inserted by changing the chromaticity values. Among other reasons, watermarks can be inserted in this way to for security reasons.

Figure 5:
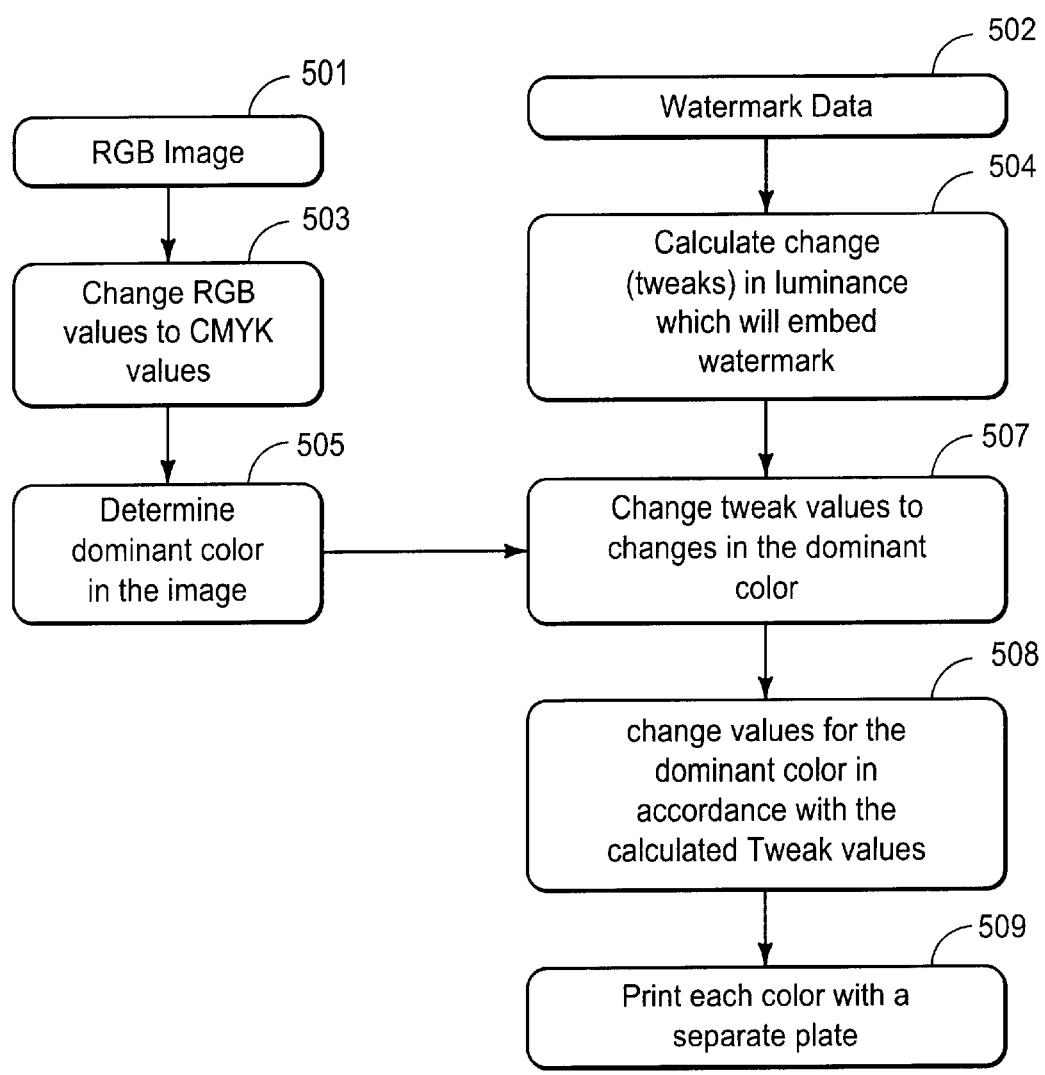
FIG. 5 is a block diagram illustrating how a watermark can be inserted in the dominant color plane of an image.

An alternate embodiment of the invention is shown in FIG. 5. In the embodiment of the invention shown in FIG. 5, a watermark is inserted into the dominant color plane of an image. Using this technique, if the plates used to print an image are not aligned, there will be no cancellation or degradation of the watermark due to the misalignment. The embodiment of the invention shown in FIG. 5 is directed to placing watermark payload data 502 in an RGB (red green blue) image 501. The tweak values needed to insert the watermark payload data in the image are calculated in a normal manner. This can be done in accordance with prior art watermarking technology. Normally such values are calculated in a adaptive manner, taking into consideration the characteristics of the image. For example see the above referenced issued patents and co-pending patent application.

The image 501 is prepared for printing by changing from RGB colors to CMYK colors in accordance with the conventional known transformation equations as indicated by block 503. As indicated by block 505, the dominant color in the image is calculated. This can be done simply by adding together the values of each color for each pixel in the image. That is the Cyan values for each pixel in the image are added together, the yellow values for each pixel in the image are added together, etc. The color with the highest cumulative value is then taken as the dominant color. Other known techniques can also be used to determine the dominant color in an image.

The tweak values are then changed to tweak values for the dominant color as indicated by block 508. This can be done in various ways. The simplest is to apply the entire tweak to the dominant color plane. For example for a CMYK image, if C is the dominant color, then coefficients of 1,0,0,0 could be used to apply the tweak to the various colors.

As indicated by block 508, the value of each pixel in the dominant color plane is then changed in accordance with the calculated tweak values. Finally the image is printed as indicated by block 509. Since the watermark data is only in one of the color planes, misalignment of the printing plates will not affect the readability or delectability of the watermark data.

Figure 6:
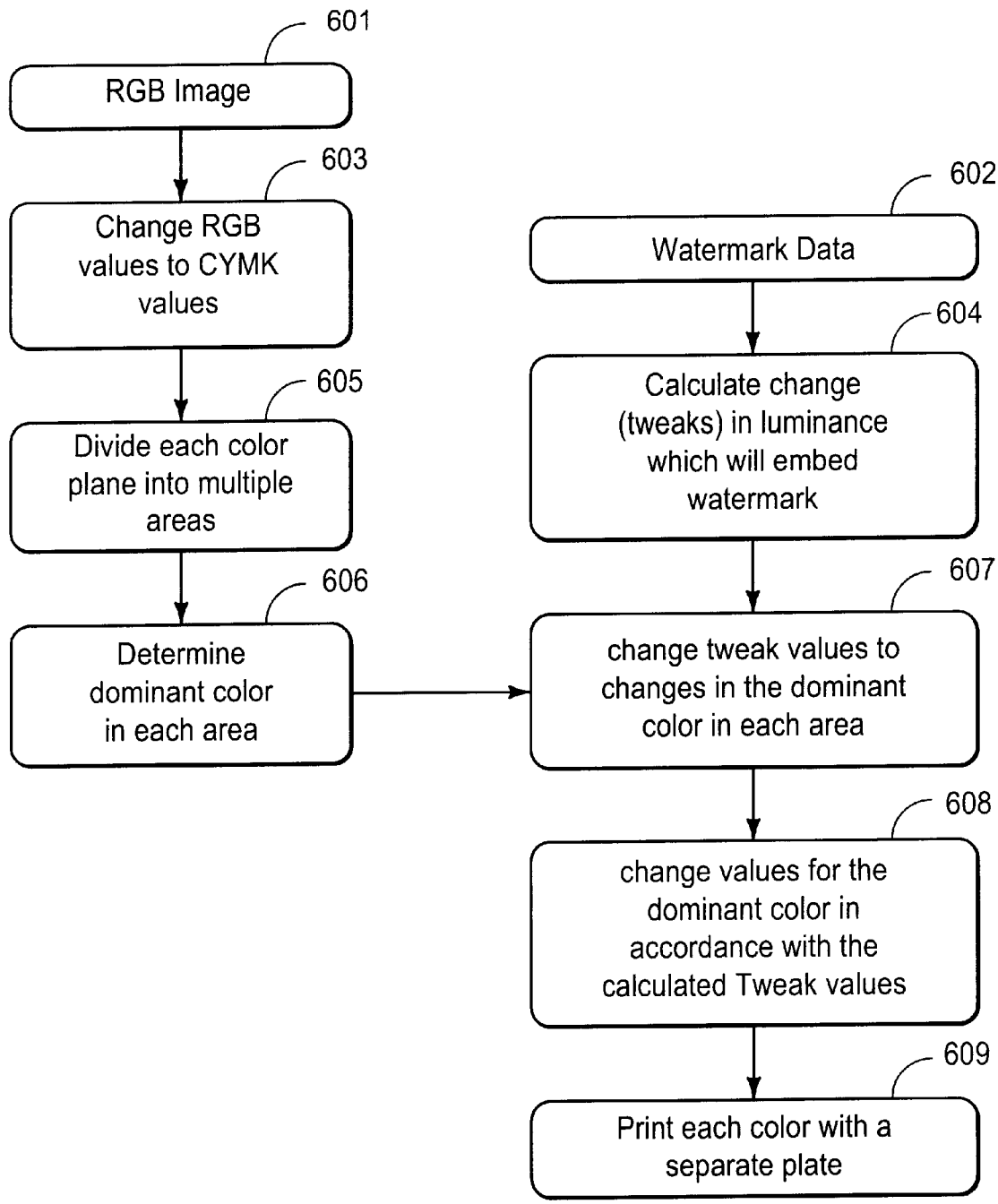
FIG. 6 is a block diagram illustrating how an image can be divided into regions and a watermark inserted into the dominant color plane in each region.
Figure 7:
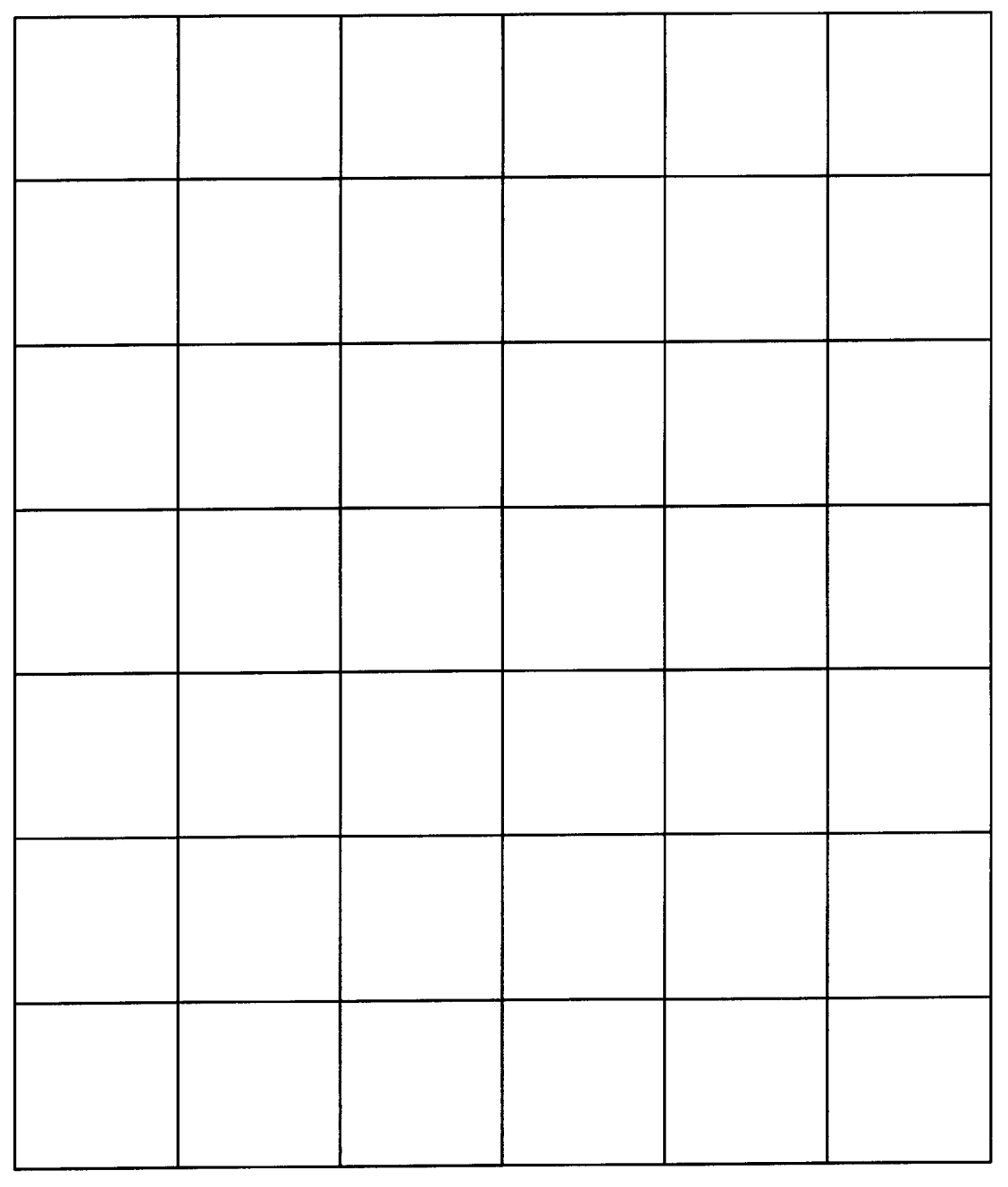

Another alternate embodiment of the invention is shown in FIG. 6. In the embodiment shown in FIG. 6, the image is divided into regions as indicated by block 605 and shown in FIG. 7. The dominant color in each region is then calculated. This calculation can be made on an area by area basis using the same technique as previously described for determining the dominant color in the entire image.

The tweak values are calculated for the dominant color in each region as indicated by block 607. The value of the dominant color in each region is then changed in accordance with the calculated values as indicated by block 608.

This embodiment involves more calculations than does the first embodiment; however, it has the advantage that if the dominant color changes from region to region, the watermark data will be in the dominant color in each regions.

In the embodiments described with reference to FIGS. 5 and 6, the watermark is inserted in the dominant color plane. In an alternative embodiment, the watermark is inserted in the dominant color plane only if the dominant color plane is on the yellow blue axis. If the dominant color plane is not on the yellow-blue axis, the watermark is inserted in the strongest of the secondary colors.

Figure 8:
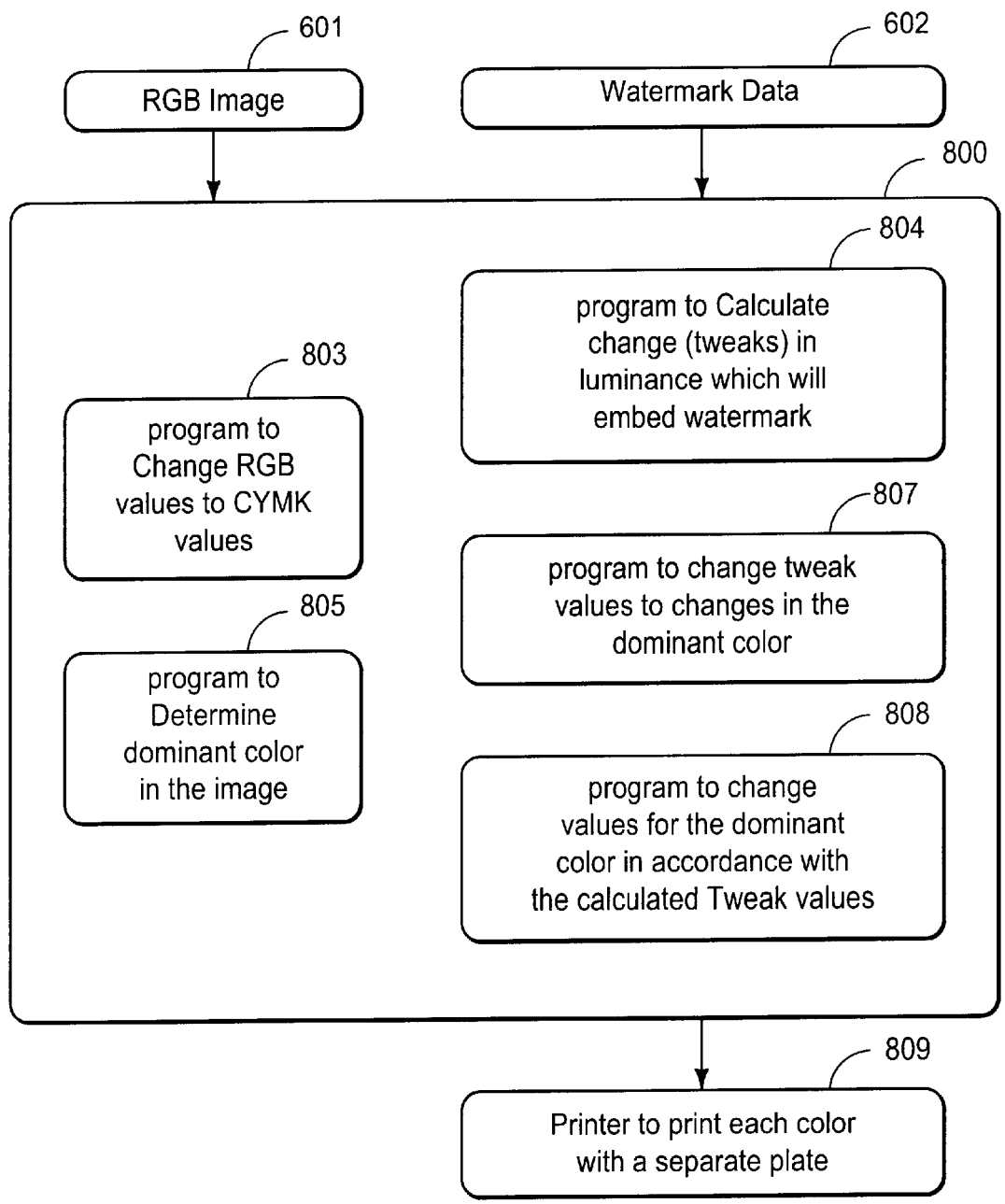
FIG. 8 is a block diagram of a system for practicing the invention shown in FIG. 5.

A system for practicing the invention is shown in FIG. 8. The system shown in FIG. 8 can be a conventional personal computer 800 running the Microsoft Windows operating system. The system would include subprograms to perform the indicated functions. The subprograms in the system include program 803 to change the RGB colors to CMYK colors, program 805 the determine the dominant color in the image as previously described, program 804 to calculate the tweak values required to add the watermark data to the image, program 807 to change the tweak values to changes in value for the dominant color, and program 808 to change the pixel values of the dominant color in accordance with the tweak values, and program. The computer 800 would include all of the input-output devices and other programs regularly available on personal computers.

Figure 9:
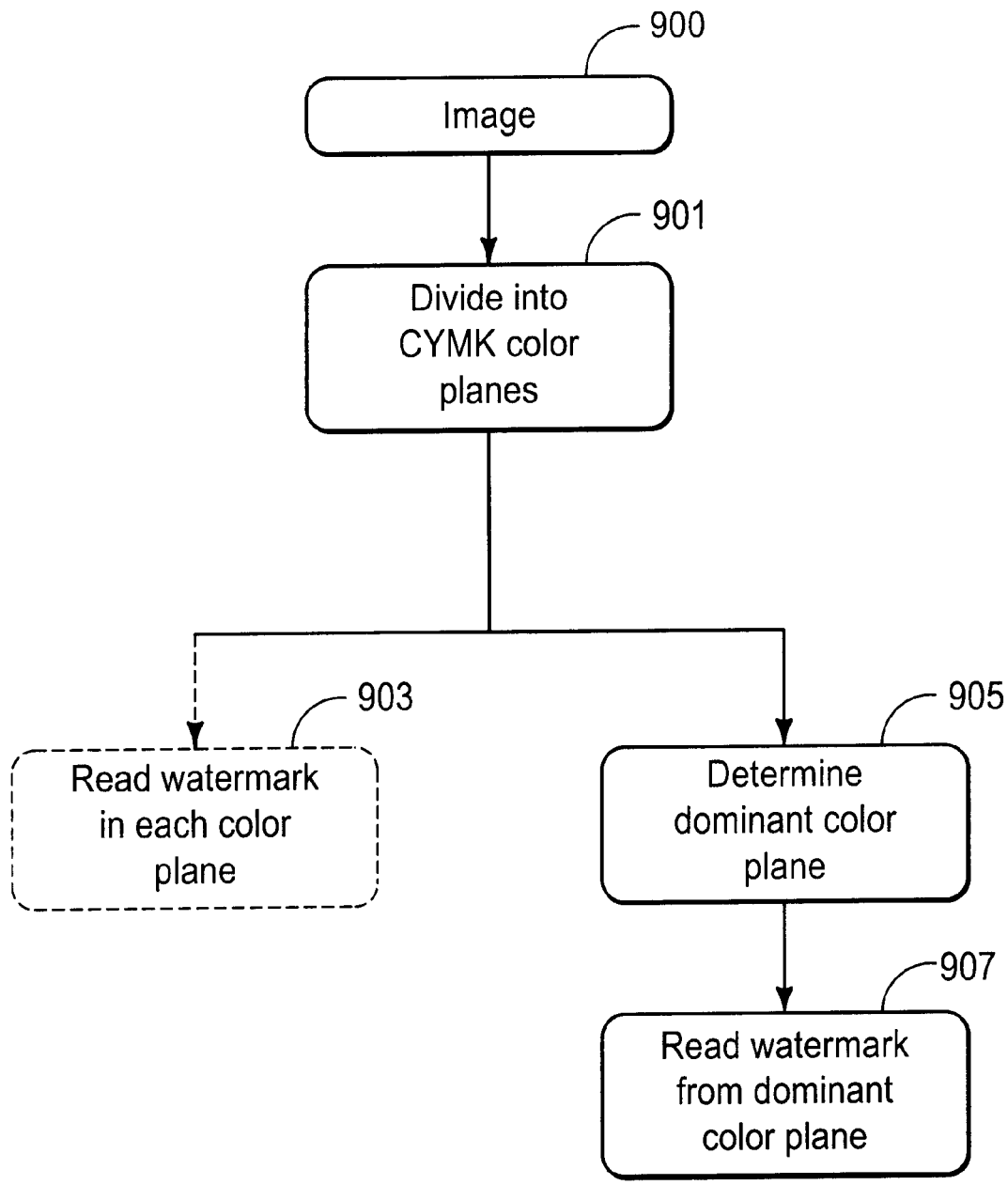
FIG. 9 is a block diagram of a watermark detection and reading process.

A process for detecting and reading a watermark is illustrate in FIG. 9. It is noted that one of the purposes of inserting a watermark into a particular selected color plane is to improve the reliability and accuracy of the watermark detection and reading operation. In the example shown an image was printed using CMYK color planes and the watermark was inserted into the dominant color plane as previously explained. In this situation during the detection process the image 900 is divided into the CMYK color planes as indicated by block 901. Next, one either attempts to detect and read a watermark from each color plane as indicated by block 903, or one determines the dominant color plane, as indicated by block 905 (this is either for the entire image or for each sub-region of the image) and the watermark is then read from the dominant color plane. The above example assumed that one knew that the image had been printed using CMYK colors.

Figure 10A:
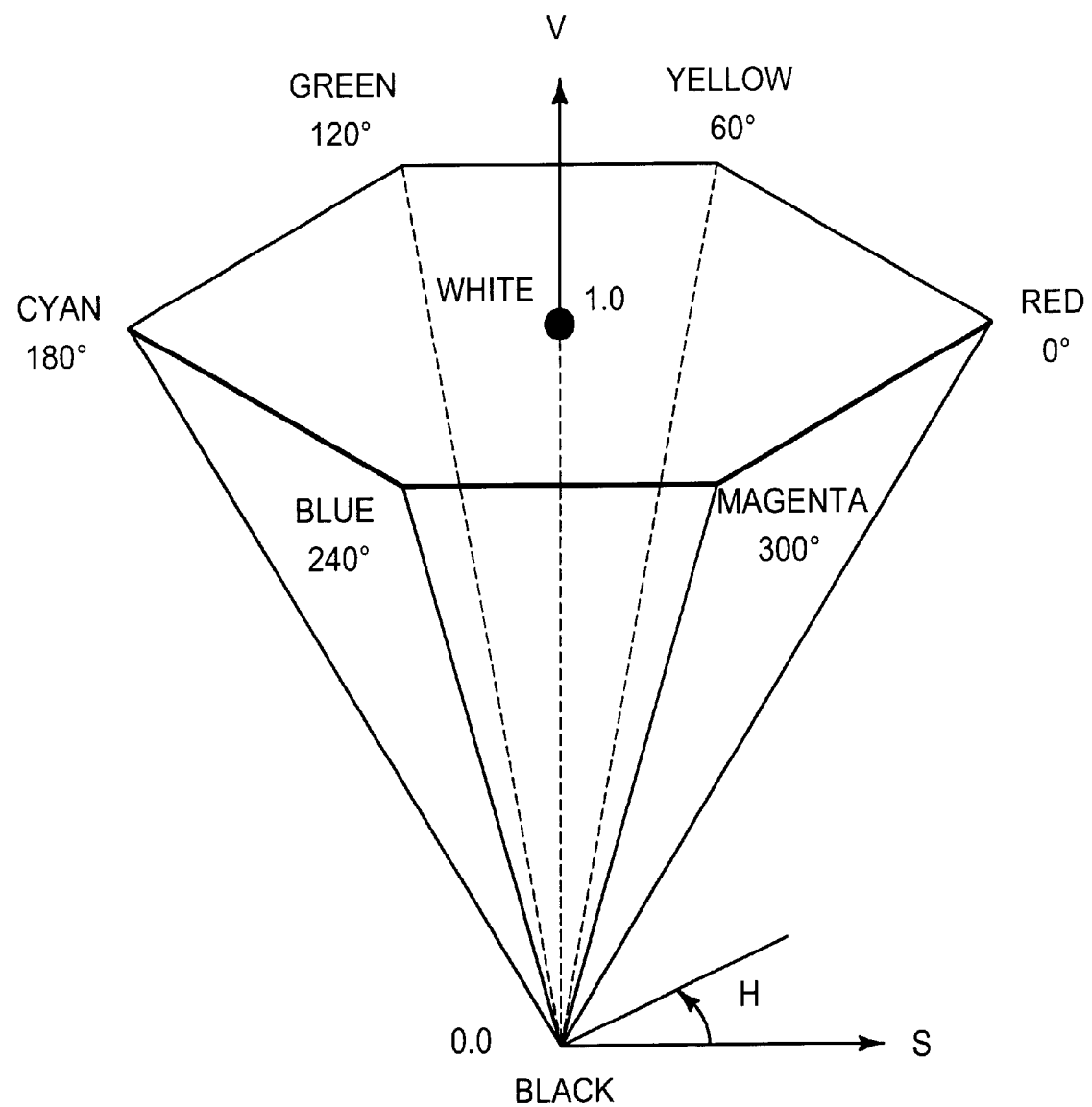
FIGS. 10A to 10D are diagrams used to explain how one detects the colors used to print an image.
Figure 10B:
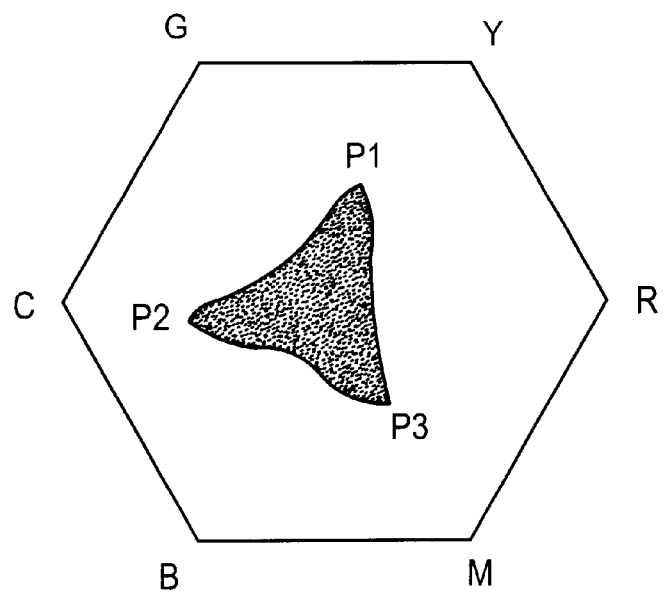
Figure 10C:
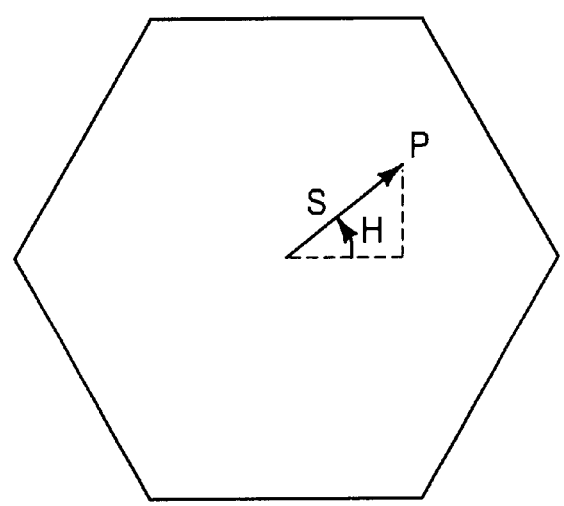
Figure 10D:
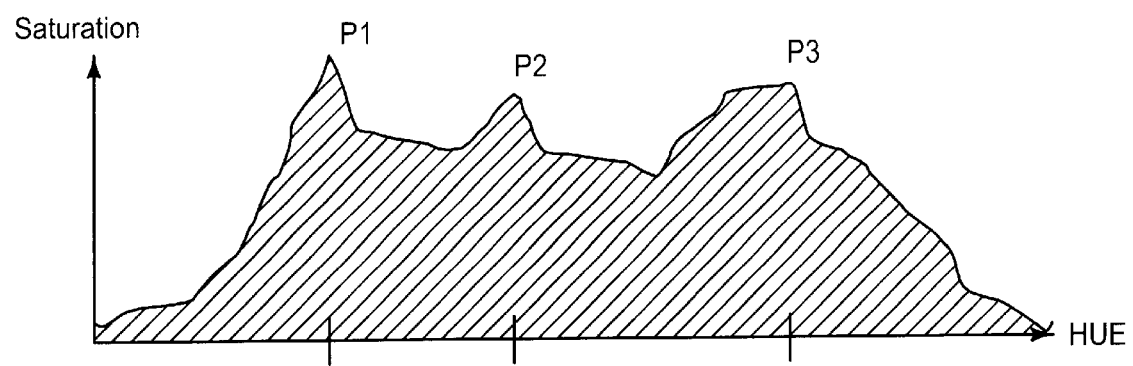

If one does not know what colors were used to print an image, the process illustrated in FIGS. 10A to 10E can be used. In this process a HSI representation of the image is generated. (It is noted than any representation with a luminosity representation such as HSV, YUV, YcrCb, etc. could have been used). A conventional single hexcone HSI color model is shown in FIG. 10A. It is important to note from this model that the vertical axis represents luminosity and that vectors representing hue and saturation are in a plane perpendicular to the vertical axis. Thus, for any particular point (or pixel) in an image hue and saturation can be represented on a single plane as indicated in FIG. 10B. FIG. 10B represents the hue and saturation of the pixels or points in particular image. As shown specifically in FIG. 10C, the polar coordinates of each point or pixel in the plane define the hue and saturation of the point or pixel. The length of the vector to the point represents the saturation and the angle represents the hue. If a histogram of the hue and saturation of each point is plotted as shown in FIG. 10C, the peaks p1, p2 and p3 represent the colors that were probably used to print the particular image. This is most likely to be the case if the image was printed with non-overlapping colors such as is for example done on items such as greeting cards. It is noted that alternatively the location of the farthest points from the center of the plane can be determined from a representation such as shown in FIG. 10B. The points p1, p2, and p3 in FIG. 10B also represent the colors of ink probably used to print the image.

Figure 10E:
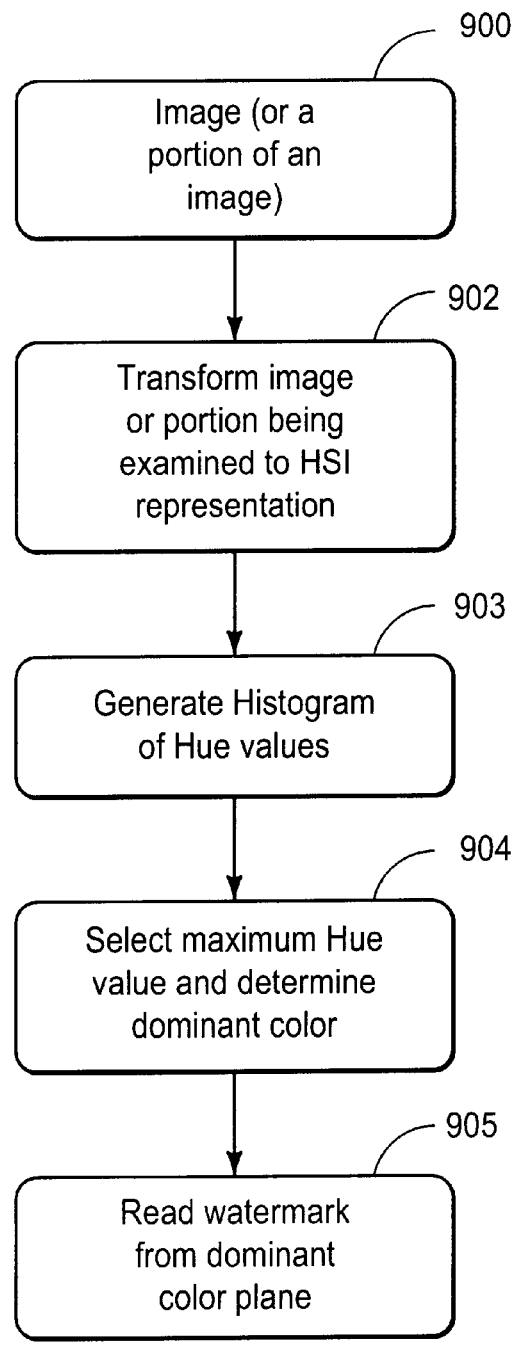
FIG. 10E is a block diagram of the process which determines which color plane of an image contains a watermark.

A block diagram of the process for determining the dominant color in an image is shown in FIG. 10E. The image (or a portion of the image of interest) is transformed into an HSI representation if it is not already in this form. The image could be an RGB image which for example was obtained over the internet or the image could have been obtained by scanning a document. A histogram of the hue and saturation values (such as that shown in FIG. 10C is then generated as indicated by block 903. The maximum hue and saturation values are selected as indicated by block 904. These values represent the dominant colors in the image (or in a part of the image that was examined). The watermark can then be read from this color plane.

In the above described embodiments, a single watermark is inserted into a selected color plane. In an alternate embodiment, multiple watermarks are be embedded into a single image by first dividing the image into multiple color planes, and by embedding a different watermark in each color plane. The watermark introduced into each color plane is introduced into the color plane with an orientation that differs from the orientation of the watermark in the other color planes. Since the orientations differ, any noise created by miss-registration of the printing plates is non-correlated and thus the watermark in one color plane would not interfere with reading the watermark from a different color plane. In summary, with this embodiment, watermarks are introduced into more than one color plane; however, the watermarks in the different color planes are introduced in different orientations thereby minimizing noise.

The present invention can be used as a security feature. The security of watermark data can be enhanced by encrypting watermark data before the data is inserted as a watermark in one particular color plane of an image. The key needed to decode the encrypted data can be added in a different color plane of the image. The legitimate user could then be informed of the color planes herein the data and the key are stored and the watermarks could be read from these color planes to obtain the key and the encrypted data (which could be decrypted using the key). An illegitimate user would have a difficult time reading the key and the encrypted data.

It is also noted that when an image is rasterized for printing, the rasterization for each color is typically done in a different direction. For example if the CMYK colors are used to print an image, the orientations of the rasterization for Cyan may be at "0" degrees, the Yellow "15" degrees, the magenta "45" degrees, and the black "75" degrees. The orientations are set by the printer. Better detection can be achieved if the watermark is introduced in each color at the same angle as the angle used to print that color. In this way, the rasterization proceeds parallel to the watermark orientation.

As the printing rasterization resolution is increased, the noise introduced by rasterizing the watermark an angle different from the watermarks orientation becomes less. Therefore, rasterizing at 600 dpi at 45 degrees of a 75 dpi watermark would have nominal re-sampling noise. However rasterizing at 133 dpi at 45 degrees of a 120 dpi watermark would have significant noise.

It is noted that as described above, the watermark is added to the image adding a "tweak" value to an image signal. In alternative embodiments of the invention, multiplication or some non linear function can be used instead of addition. It is also noted that while the examples given relate to watermarking in the spatial domain, the invention is equally applicable to watermarking in the frequency domain.

While the invention has been shown and described with respect to preferred embodiments thereof, it should be understood that other changes in form and detail may be made without departing from the spirit and scope of the invention. The scope of the invention is limited only by the appended claims.

We claim:

1. A method of watermarking an image comprising the steps of
   dividing said image into color planes,
   determining the dominant color plane in said image,
   inserting watermarking data in said dominant color plane,
   whereby misregistration of color plates when said image is printed will not affect the detectability or readability of said watermarking data.

2. A method of watermarking an image comprising the steps of
   dividing said image into color planes,
   dividing each color plane into multiple areas,
   determining the dominant color plane in each of said areas,
   inserting watermarking data in the dominant color plane in each area,
   whereby misregistration of color plates when said image is printed will not affect the detectability or readability of said watermarking data.

3. A method of watermarking an image comprising the steps of
   dividing said image into color planes,
   determining the dominant color plane in said image,
   inserting watermark data in said dominant color plane if said dominant color plane is on the yellow-blue axis and inserting the watermark data in the strongest secondary color plane if said dominant color plane is not on the yellow-blue axis, whereby misregistration of color plates when said image is printed will not affect the delectability or readability of said watermark.

4. A method of watermarking an image comprising:
   dividing an image into a plurality of color planes;
   inserting a digital watermark into at least one of the color planes; and
   using separate printing plates to print each of said color planes,
   wherein said watermark is adaptively inserted into the at least one of the color planes.

5. The method recited in claim 4 wherein watermarks are inserted in two or more of said color planes.

6. A method of watermarking media comprising:
   dividing the media into color planes;
   determining the dominant color plane in the media; and
   inserting watermark data in the dominant color plane,
   wherein misalignment of printing color plates will not render the watermark data undetectable when the media is printed with the misaligned color plates.

7. A method of steganographically marking media comprising:
   dividing the media into different colors;
   determining a first dominant color of the different colors; and
   steganographically inserting data in the first dominant color if the first dominant color is on the yellow-blue axis and steganographically inserting the data in a second dominant color if the first dominant color is not on the yellow-blue axis,
   wherein the first dominant color is more dominant than the second dominant color, and wherein misalignment of printing color plates will not render the data undetectable when the media is printed with the misaligned color plates.

8. A method of watermarking media comprising:
   dividing the media into a plurality of colors;
   adaptively inserting a digital watermark into the dominant color; and
   using separate printing plates to respectively print each of said colors,
   wherein the digital watermark remains detectable despite printing plate misalignment.

9. The method of claim 8, further comprising inserting a digital watermark into a less dominant color.

10. The method of claim 9, wherein the digital watermark in the less dominate color has a first orientation, and the digital watermark in the dominant color has a second different orientation.

* * * * *

UNITED STATES PATENT AND TRADEMARK OFFICE
CERTIFICATE OF CORRECTION

PATENT NO. : 6,763,122 B1  
APPLICATION NO. : 09/694465  
DATED : July 13, 2004  
INVENTOR(S) : Rodriguez et al.

It is certified that error appears in the above-identified patent and that said Letters Patent is hereby corrected as shown below:

Please add on title page of the patent: --item (73) Assignee: Digimarc Corporation, Beaverton, OR (US)--.

Column 1, line 27, change "which is marked" to --which is marketed--.

Column 1, line 42, change "area of the imager" to --area of the image--.

Column 2, line 48, change "where aligned, the" to --were aligned, the--.

Column 2, line 60, change "it would weakens the" to --it would weaken the--.

Column 3, line 15, change "color plane, it is" to --color planes, it is--.

Column 4, line 23, change "into one or more or more of the " to --into one or more of the--

Column 5, line 1, change "planes in image is" to --planes in an image is--.

Column 5, line 33, change "of various know adaptive" to --of various known adaptive--.

Column 5, line 57, change "description had been" to --description has been--.

Column 6, line 16, change "in this way to for" to --in this way too for--.

Column 6, line 29, change "in a adaptive matter" to --in an adaptive manner--.

Column 8, line 54, change "readability or delectability of" to --readability or detectability of--.

UNITED STATES PATENT AND TRADEMARK OFFICE
CERTIFICATE OF CORRECTION

PATENT NO. : 6,763,122 B2
APPLICATION NO. : 09/694465
DATED : July 13, 2004
INVENTOR(S) : Rodriguez et al.

It is certified that error appears in the above-identified patent and that said Letters Patent is hereby corrected as shown below:

Column 7, lines 2-3, change "in each regions" to --in each region--.

Column 7, line 15, change "program 805 the determine" to --program 805 to determine--.

Column 7, line 25, change "illustrate in Fig. 9" to --illustrated in Fig. 9--.

Column 7, line 52, change "in particular image" to --in a particular image--.

Column 8, line 14, change "watermarks are be embedded" to --watermarks are embedded--.

Column 8, line 33, change "planes herein the data" to --planes wherein the data--.

Column 9, line 34, change "delectability or readability" to --detectability or readability--.

Column 10, line 37, change "less dominate color has" to --less dominant color has--.

Signed and Sealed this

Twenty-first Day of August, 2007

JON W. DUDAS
*Director of the United States Patent and Trademark Office*